(12) United States Patent
Fachner

(10) Patent No.: US 11,968,969 B2
(45) Date of Patent: Apr. 30, 2024

(54) ATTACHMENT ASSEMBLY AND CUPHOLDER

(71) Applicant: Brock Fachner, San Luis Obispo, CA (US)

(72) Inventor: Brock Fachner, San Luis Obispo, CA (US)

(*) Notice: Subject to any disclaimer, the term of this patent is extended or adjusted under 35 U.S.C. 154(b) by 99 days.

(21) Appl. No.: 18/045,998

(22) Filed: Oct. 12, 2022

(65) Prior Publication Data

US 2024/0023533 A1     Jan. 25, 2024

Related U.S. Application Data

(60) Provisional application No. 63/391,553, filed on Jul. 22, 2022.

(51) Int. Cl.
    *A01K 97/06*      (2006.01)
    *A47G 23/02*      (2006.01)

(52) U.S. Cl.
    CPC .......... *A01K 97/06* (2013.01); *A47G 23/0216* (2013.01)

(58) Field of Classification Search
    CPC ..... A01K 97/00; A01K 97/06; A47G 23/0216
    See application file for complete search history.

(56) References Cited

U.S. PATENT DOCUMENTS

| | | | |
|---|---|---|---|
| 9,253,970 B2* | 2/2016 | Carnevali | A01K 97/22 |
| 2015/0208634 A1* | 7/2015 | Box | A47B 88/00 |
| | | | 108/25 |
| 2017/0231209 A1* | 8/2017 | Pippins | F21V 23/0471 |
| | | | 43/17 |

OTHER PUBLICATIONS https://www.boatoutfitters.com/rod-holder-mount-fillet-table-with-plano-tray-storage?gad_source=1&gclid=CjwKCAiA6KWvBhAREiwAFPZM7tiOiXdwNh0BI9RVjZXD9R8gNhSLqPsF3KYJVrYKB9_V7VqPfT164RoCPZ4QAvD_BwE 2018.*

* cited by examiner

*Primary Examiner* — Richard G Davis
(74) *Attorney, Agent, or Firm* — Brennan, Manna & Diamond, LLC

(57) ABSTRACT

The present invention relates to an improved outdoor accessory in the form of a mounting assembly for use with pole holders and a cupholder. The mounting assembly includes a mounting base for standard tackle boxes or other outdoor equipment which provides users with a mounting attachment that allows users to mount the tackle box to a pole holder on a watercraft, pier, deck or other structure. This mounting assembly will support the tackle box (or other outdoor item) in a secure manner. The cupholder allows users to secure beverages or other items for easy access. Combining the two devices, they allow a tackle box to be mounted securely in an opening, such as a pole holder, which will allow for easy access to the tackle box and items such as beverages.

20 Claims, 8 Drawing Sheets

ATTACHMENT ASSEMBLY AND CUPHOLDER

CROSS-REFERENCE TO RELATED APPLICATION

The present application claims priority to, and the benefit of, U.S. Provisional Application No. 63/391,553, which was filed on Jul. 22, 2022, and is incorporated herein by reference in its entirety.

FIELD OF THE INVENTION

The present invention relates generally to the field of outdoor equipment and accessories. More specifically, the present invention relates to improved outdoor accessories in the form of both a mounting mechanism for tackle boxes or other outdoor equipment that provides users with a new mounting configuration for tackle boxes that allows users to attach the mount to the pole holder on a boat, kayak rail, deck rail, or other watercraft which will support the tackle box in a secure manner. The present invention also includes a cupholder that allows users to secure beverages or other outdoor items for easy access. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in fishing equipment and outdoor sporting accessories. Standard tackle boxes, beverages, and other items can be used in fishing on a boat, kayak, other watercraft or fishing from piers, deck rails and other sea or lake side structure. Normally, the tackle box or other sporting equipment is typically placed on the floor or deck, taking up valuable space and also, because it is unsecured and on the floor or deck, it can take away valuable fishing time when an individual must retrieve various items from it. Also, beverages or other items, when unsecured, can be scattered about the watercraft or the area where they are placed. Furthermore, securing the tackle box to the floor or by other means may not be possible without making additional, permanent modifications to the watercraft, pier or railing. Additionally, moving about the area where the tackle box or other sporting equipment may become dangerous when a tackle box, beverages, or other items are not secured, especially in times of more turbulent waters or when reeling in a fish which requires the individual to move about the floor or deck and potentially tripping over the tackle box.

As stated previously herein, although fishing tackle boxes and other equipment accessories are generally effective at storing and maintaining access and organization of tackle and other accessories while fishing, tackle boxes are usually placed on the floor or deck taking up valuable space and posing a trip hazard for those engaged in the activity. When placed on the floor or deck, in order to retrieve tackle or other accessories, the user must move from the fishing pole or rod area (which can be any location on the watercraft or pier where the pole holders are installed) to the floor or deck to retrieve tackle and other items, thus wasting valuable time while fishing. Further, standard tackle boxes do not possess an independent means of being secured to the watercraft, pier, railing or pole holder on a watercraft or pier without making permanent modifications to the boat, kayak, other watercraft, pier or railing. Securing the tackle box in storage on the watercraft or in a closet would help in avoiding a tripping hazard, but would thus not be accessible during the fishing activity. Additionally, another accessory of the present invention is a cupholder device. When beverages or other items are not secured during a fishing or other outdoor experience, they can also pose a trip hazard, become lost, spill or also cause the loss of valuable outdoor time. If the contents are spilled, the contents can attract insects or other pests. The above scenarios constitute less than ideal situations for individuals engaged in the fishing activity as the tackle box, beverage, and other items are stored on the floor or deck taking up valuable space on the watercraft or pier, presenting a trip hazard, and thus creating a less efficient fishing experience. As such, it is thus an object of this invention to at least ameliorate the danger, inefficiency, and inconvenience associated with these situations. The present invention thus relates to an improved tackle box, or to accessories for a tackle box or other outdoor equipment, which acts to alleviate the above-described dangerous, inefficient, and inconvenient situations.

Thus, it is necessary for users to have a means to easily, efficiently, and effectively attach or secure the tackle box to the watercraft or pier, while not making additional, permanent modifications to the watercraft, pier or railing. Generally, tackle and equipment boxes do not possess a means of being secured to the watercraft, railing or pier wall nor a means for holding a beverage or other fishing accessory. However, many users need a pole attachment device that can be used to secure the tackle box to a watercraft, railing or pier without taking up valuable deck space and also secure other items to the tackle or accessory box itself, such as a beverage or other items. Therefore, users require outdoor accessories including an attachment device and cupholder that allow a tackle or accessory box or other outdoor item to be secured to the pole holder of a watercraft, railing or pier and also allow beverages or other items to be placed on the side of the tackle box via the cupholder.

Therefore, there exists a long-felt need in the art for outdoor accessories, including a pole attachment and cupholder. There is a long-felt need in the art for a pole attachment configuration that provides users with a new mounting component for tackle or accessory boxes and other outdoor equipment. There is also a long-felt need in the art for a pole attachment configuration that allows users to attach the mounting component to the base of the tackle or accessory box and secure that equipment to a pre-established pole holder on a watercraft, pier or railing or accessible cylindrical cavity within a wall or other structure without making additional, permanent modifications to the watercraft, railing or other structure. There is also a long-felt need in the art for a pole attachment configuration that features a hinge component that allows the pole component to retract into the cavity of the mounting assembly when not in use. Further, there is also a long-felt need in the art for a pole attachment configuration that allows users to extend the mounting pole once it is attached to the tacklebox or other outdoor equipment and then slide or insert the pole component into the cylindrical holder on a watercraft, railing, pier or other structure. Additionally, there is a long-felt need in the art for a cupholder device that can be mounted to outdoor equipment including but not limited to a beverage cooler, bench, tackle box, or mobility device that will allow beverages or other items to be secured when they are not in use, but also to remain readily accessible. Moreover, there is a long-felt need in the art for a pole attachment mount and a cupholder that can be attached on the base or side of the tackle box by the user (after manufacture) or be manufactured together with the tackle box or other outdoor equipment to allow the tackle box or other outdoor equipment to be secured to a pre-existing cylindrical opening or pole holder on a watercraft and also allow users to store beverages, consumable goods, or other supplies for easy access while fishing or engaging in other outdoor activities. Further, there is a long-felt need in the art for a pole attachment mount and cupholder that improves the overall watercraft or pier safety during fishing or other activities and helps secure the tackle box to the ?pole holder? on a watercraft, pier or deck to improve safety, efficiency, and convenience while engaging in fishing, watercraft or outdoor activities.

The subject matter disclosed and claimed herein, in one embodiment thereof, comprises a pole attachment mount and a cupholder accessory. The pole attachment mounting device is designed to be secured or attached to the base of a tackle box or other outdoor item. The pole attachment mounting device comprises a cylindrical mounting pole that can be inserted into a pole holder on a watercraft, railing, deck, pier or other structure having a cylindrical cavity. The mounting and hinge components are made of a sturdy metal or polymer material and includes a hollow base that allows the pole mounting component, which is attached to a hinge mechanism to retract or be folded into the mounting base. The hinge mechanism allows a user to place the pole mounting component in an operative or extended position and the pole mounting component is placed within a pole holder to secure the tackle box or other outdoor item to the watercraft, railing, pier or other structure. The cupholder allows users to easily and conveniently store items on the side of the tackle box or other outdoor item. Users can easily mount the pole attachment and the cupholder to a tacklebox or other outdoor equipment to secure beverages, consumables or other items while engaging in outdoor activities. Further, specifically while fishing, the pole attachment mounting assembly can be attached to the tacklebox and then in turn secured in a cylindrical opening such as pole holder on a watercraft, railing, pier or other structure. The cupholder can secure beverages or other items to the tackle box or other outdoor items when the pole attachment is secured in the cylindrical opening such as a pole holder. The use of the pole attachment mounting assembly and cupholder device allows users to maintain safety and ease of access while fishing and engaging in other outdoor activities.

In this manner, the pole attachment mounting assembly and cupholder device of the present invention accomplishes all of the foregoing objectives and provides users with outdoor accessory devices that improve the overall outdoor experience and allows easy access to the tackle box and other accessories needed while fishing or engaging in outdoor activities. The device allows a user to utilize the pole attachment mounting assembly to secure the tackle box to a cylindrical opening such as an existing pole holder on a watercraft or pier railing while fishing or engaging in other outdoor activities. The device also allows the user to utilize the pole attachment mounting assembly to be attached to other items such as an umbrella holder to create a usable surface. The cupholder also allows users to secure beverages or other items to a tackle box or other outdoor item, such as a cooler, outdoor deck, mobility device, or other surface. The devices provide a more efficient mechanism for securing and accessing the tackle box, beverages, and other items in a watercraft or other outdoor setting.

SUMMARY OF THE INVENTION

The following presents a simplified summary in order to provide a basic understanding of some aspects of the disclosed innovation. This summary is not an extensive overview, and it is not intended to identify key or critical elements or to delineate the scope thereof. Its sole purpose is to present some general concepts in a simplified form as a prelude to the more detailed description that is presented later.

The subject matter disclosed and claimed herein, in one embodiment thereof, comprises an attachment mounting assembly and a cupholder. The mounting assembly is designed to be secured or attached to the base of a tackle box or other outdoor item. The mounting assembly comprises a cylindrical mounting element such as a pre-configured pole segment that can be attached to a pole holder or support on a watercraft, rail, pier, decking or other structure with a cylindrical cavity. The mounting and hinge components are made of a sturdy metal or polymer material and includes a hollow base that allows the cylindrical mounting element, which is attached to a hinge mechanism to retract or be folded into the mounting assembly. The hinge mechanism allows a user to place the cylindrical mounting element in an operative or first position or extended or second position and the cylindrical mounting element or pole component is placed within a corresponding opening within the pier railing or watercraft to secure the tackle box or other outdoor item to the boat or structure. The cupholder allows users to easily and conveniently store items on the side of the tackle box or other outdoor item or receptacle. Users can easily mount the cylindrical mounting element and the cupholder to a pre-existing tacklebox or other outdoor equipment to secure beverages or other items while engaging in outdoor activities. Further, specifically while fishing, the cylindrical mounting element can be mounted on the tacklebox and then in turn secured in the pole holder on a watercraft. The cupholder can secure beverages or other items to the tackle box or other outdoor item when the pole attachment device is secured in a pole or equipment holder. The use of the pole attachment device and cupholder device allows users to maintain safety and ease of access while fishing and engaging in other outdoor activities.

It is known that most watercraft, pier railings, decks and other structures near the water are equipped with several pole or equipment holders, e.g., those that may hold a fishing rod, flag, banner, net or other item that possess an empty opening such as cylindrical cavity when they are in an inoperative configuration and an operative configuration in which fishing rods or poles are inserted and secured into the openings or holders during a fishing experience or other activity. Insofar as the general configuration of these existing openings are well known, it is not described in further detail herein.

As stated supra, the mounting assembly of the present invention is configured to fit into a standard opening such as a pole holder on a watercraft, railing on a pier or other structure and has top and bottom opposing side walls, as well as right and left opposing side walls and a hinge component that allows the pole or attachment element to be folded into or retracted into the mounting component itself so that when in an inoperative condition, the tackle box or other outdoor equipment can lay flat on a surface to which it is being placed. In one embodiment, the attachment assembly and cupholder is a standard tackle box as is known in the art and the mounting component is an add-on assembly which may be adhered or otherwise fastened to the tackle box or other outdoor equipment after manufacture. The attachment assembly and cupholder can be mounted to a tackle box or other outdoor equipment via any suitable securing mechanism as is known in the art, such as screws, bolts, washers, adhesives, hook and loop fasteners, magnets, or other fastening component depending on the preferences of a user. Depending on how the present invention is attached to the tackle box allows the invention to be either permanently or removably attached to the tackle or equipment box or container. In another embodiment, the tackle box or other outdoor equipment and the pole attachment assembly and cupholder are manufactured together as one integral piece at the point of sale.

In one embodiment, the pole component comprises a cylindrical pole. The mounting component or base is typically rectangular in shape and is sized to support the base of the tackle box, however, it should be understood that the mount can be any suitable shape and size as is known in the art, depending on the preferences of a user and the configuration of the box or container that it is intended to work with. The mounting component includes elements of varying height and the pole component has a pole or insertion piece of varying lengths and thicknesses. While the invention has been described as an accessory for watercraft activities, pier railings and other similar structures, it should be understood that the invention may be used with umbrella stands, beverage insulation devices, benches, mobility devices, and other items where it would be beneficial for the user to mount an item into a cavity and/or utilize a cupholder.

More particularly, the mechanism for attaching the mount may include a number of fasteners that are securable to a tackle box or other outdoor item in a configuration in which each fastener is either placed through the material of the tackle box and through the mounting component and then fastened on the underneath side of the mounting component; or in a removable arrangement, magnets, hook and loop fasteners are adhered to the box or container and the mounting component. The insertion component is positioned in a configuration in which the pole component is displaceable utilizing the hinge which moves the insertion element between an operative or first position and an inoperative or second position. To secure the mounting component to the container or box, the mounting mechanism may include screws, bolts, washers, and other types of fasteners that permit the tackle box or other outdoor item to be secured to the pole attachment device. Alternatively, the attachment mechanism may use one or more temporary or removable fasteners, such as magnets, hook, or loop fasteners. Through use of removable or temporary fasteners, the owner of the container or box may remove the attachment mechanism when it is not necessary.

Further, the attachment assembly when in an operative configuration with the mounting assembly is secured to the base of a tackle box, container, or other outdoor equipment and the mounting pole in an extended configuration, is positioned to slide into the pole holder on a watercraft or pier railing, which will support the tackle box in a secure manner to allow for easy access during the boating, athletic, or other outdoor experiences. The cupholder, when secured to the tackle box or other outdoor equipment and when the base and circular support is extended, is positioned to allow a cup, beverage, or other item to also be stored in a secure manner to allow for easy access during the boating, athletic, or outdoor experience and in a manner which does not interfere with the use of the tackle box or other container. With the mounting assembly and cupholder positioned as defined, and the mounting assembly secured into a holder on a watercraft, pier or other structure, an individual or other user can easily, conveniently, and securely access the tackle or other accessories in the container or box and any beverage, cup, or other items. Thus, the combination of devices are utilized to improve safety in the watercraft, on the pier, deck or other structure and allow easy access during the fishing or other outdoor experience.

In one embodiment, the mount and mounting element may be formed of a metal, such as aluminum or galvanized steel or polymer material, such as PVC, or any other suitably strong, sturdy material as is known in the art.

In another embodiment, the overall dimensions and the shape of the mounting assembly may be greatly variable and, in particular, may be determined based on the preferences of a user. Generally, in this regard, each side of the mounting component may be approximately between three-fourths and five-sixths of the total dimension of the tackle box of the type commonly found in the industry.

In a still further embodiment, a tackle box and mounting assembly is provided and includes a tackle box attached to a mounting assembly top surface, with the mounting assembly having a bottom surface with side walls and end walls extending downwardly from the bottom surface, and a pole attachment connected to the bottom surface by hinge support walls and a hinge. The pole attachment is movable between an extended position and a retracted position, and when in the retracted position, the pole attachment is flat with the side and end walls. The pole attachment has gripping material on a surface of the pole attachment and a locking pin to hold the pole attachment in either the retracted or extended position.

In yet another embodiment, the mounting assembly and cupholder may include a plurality of indicia and/or graphics.

In yet another embodiment, a method of securing the tackle box or other container to the watercraft, pier, railing or other structure while engaged in various activities is described. The method includes the steps of providing a mounting assembly having a mounting platform and an insertion component. The insertion component is attached to the mounting assembly by a hinge component that allows the insertion element or pole to both retract and to extend. The method includes the steps of utilizing, which is when the pole component is extended, it can be inserted into a holder on a watercraft, pier railing or into another cavity or opening. The method also ?includes? the steps of securing the mounting component to the tackle box, container or other outdoor equipment using one of permanent or removable fasteners. Further, the method includes securing the fasteners to the base of the box, container or other outdoor equipment. Finally, positioning the mounting assembly in a holder or other opening when it is secured to a tackle box, container or other outdoor equipment allows easy access during fishing or other outdoor experience. Additionally, similarly, the method of utilizing the cupholder to secure a cup, beverage, or other item is described. The cupholder is positioned by attaching it to an exterior surface or wall of the tackle box, container or other outdoor equipment using one of permanent or removable fasteners. Utilizing the cupholder at the side of the tackle box or other outdoor equipment allows a user to easily access a beverage, cup, or other item.

In use, when mounted on the base of the tackle box, container or other outdoor equipment or manufactured together with the tackle box, container or other outdoor equipment, and when the pole component is secured in the opening or holder on a watercraft or pier railing, for example, the pole or insertion component will be displaced into its operative configuration and secured into the opening such as those provided for a pole or rod on a watercraft or pier railing, so that the insertion component will secure the tackle box or container to the pole or rod holder on a watercraft or railing on a pier. Further, when the mounting component is attached on the base of the tackle box or other outdoor equipment, it allows it to be placed in an opening, such as a pole holder, to allow for ease of access while maintaining safety while fishing and moving about a watercraft, deck or pier. Additionally, when installed, the cupholder allows items to be stored securely and conveniently such that it eliminates additional clutter about the watercraft, deck, pier or other area and provides accessibility during a fishing or other outdoor experience.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
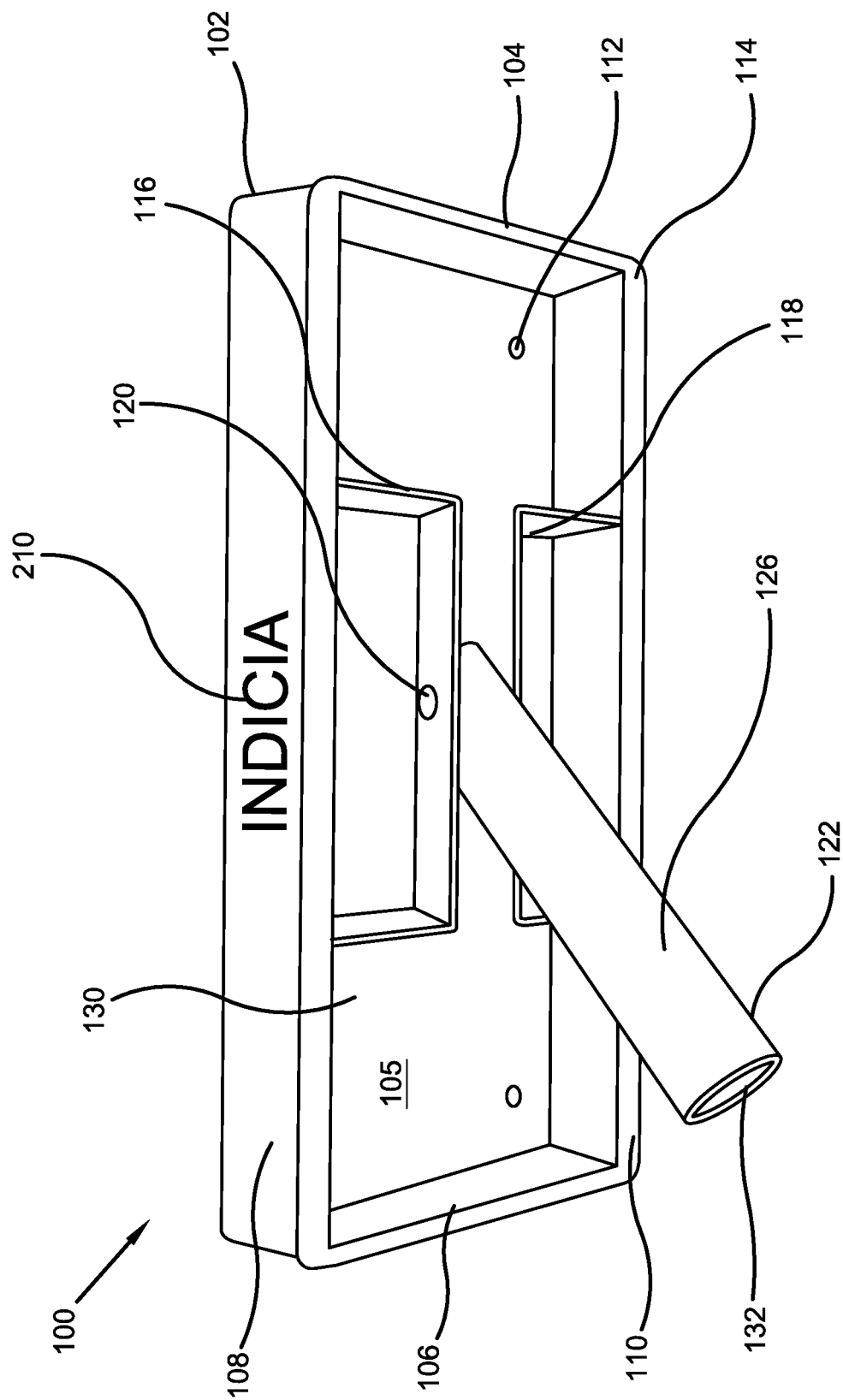
FIG. 1 illustrates a perspective view of one potential embodiment of the mounting assembly of the present invention with the insertion or pole component extended in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for outdoor accessories including a mounting assembly and cupholder. There is a long-felt need in the art for a mounting assembly that can be used with openings in the walls of watercraft, pier and deck railings and other structures that provides users with a new mounting component for tackle boxes and other outdoor equipment. There is also a long-felt need in the art for an attachment device that allows users to attach the mounting component to the base of a container such as a tackle box and secure that outdoor equipment in an opening or pole holder on a watercraft or other structure or accessible cylindrical cavity without making additional, permanent modifications to the watercraft, deck or pier. There is also a long-felt need in the art for a mounting assembly that uses conventional openings for holding recreational equipment that features a hinge that allows the insertion element of the mounting assembly to retract into the base or cavity of the mounting component when not in use. Further, there is also a long-felt need in the art for a mounting assembly that allows users to extend the insertion element once it is mounted to the tackle box or other outdoor equipment and slide the insertion element or pole component into an opening such as a pole holder on a watercraft or railing for a pier or a deck. Additionally, there is a long-felt need in the art for a cupholder that can be mounted to an exterior wall or other surface of outdoor equipment including, but not limited to, a beverage cooler, park bench, or mobility device that will allow beverages or other items to be secured when they are not in use, but also remain accessible. Moreover, there is a long-felt need in the art for a combination mounting assembly and a cupholder that can be mounted on the base or side of the tackle box by the user (after manufacture) or be manufactured together with the tackle box or other outdoor equipment to allow the tackle box or other outdoor equipment to be secured to an opening such as a pole holder on a watercraft and also allow users to store beverages or other outdoor supplies for easy access while fishing or engaging in other outdoor activities. Further, there is a long-felt need in the art for a mounting assembly or pole attachment device and cupholder that improves overall watercraft and deck safety during fishing or other activities and helps secure the tackle box to a holder on a boat or deck to improve safety, efficiency, and convenience while engaging in boating or outdoor activities.

In a further embodiment, the cup holder includes a side wall for fastening to the side of the tackle box or other container, a base which is pivotable from a closed position to an open position to hold a can, bottle or other item and supporting arms which are pivotable from a closed position to an open position to aid in supporting the can, bottle or other item. The base and supporting arms are pivotable about a hinge. The supporting arms form extensions extending out from the side wall and create concave supporting arms which can extend around a circular container.

The present invention, in one exemplary embodiment, is a novel combination of a mounting assembly which uses openings available on a boat, pier or deck railing or other structure and a cupholder. The mounting assembly is designed to be secured or mounted to the base of a tackle box, container or other outdoor item. The mounting assembly or pole attachment device includes an insertion element which in one embodiment is a cylindrical mounting pole that can be inserted into a pole holder on a watercraft, railing, structure, or other mechanism with a cylindrical cavity or opening. The mounting and hinge components are made of a sturdy metal or polymer material such as polyvinyl chloride (PVC), and includes a hollow base that allows the insertion element or pole component, which is attached to a hinge to retract or be folded into the base of the mounting component. The hinge allows a user to place the pole component in a first operative position or second and extended position and the insertion element or pole component is placed within the opening or pole holder to secure the tackle box, container or other outdoor item. The cupholder allows users to easily and conveniently store items on an exterior surface or side of the tackle box or other outdoor item. Users can easily mount the mounting assembly or pole attachment device and the cupholder to a tackle box or other outdoor equipment to secure beverages or other items while engaging in outdoor activities. Further, specifically while fishing, the pole attachment device can be mounted on the tackle box and then, in turn, secured in the pole holder on a watercraft. The cupholder can secure beverages or other items to an exterior surface such as a wall on a tackle box or other outdoor item when the pole attachment device is secured in the opening such as a pole holder. The use of the mounting assembly and cupholder allows users ease of access and to maintain safety while fishing and engaging in other outdoor activities.

The present invention also includes a novel method of securing a tackle box or other outdoor equipment into an opening or pole holder in a watercraft. The method includes the steps of providing a pole attachment device comprising a mounting component and an insertion component. Next, positioning the mounting assembly on the base of a tackle box or other outdoor item. Further, the method includes inserting the pole component into an opening or other cavity for a pole holder on a watercraft, railing, deck or other structure. Finally, utilizing the mounting component and insertion component to secure the tackle box in the opening while fishing or engaging in other water-related activities. Second, the method also includes the steps of providing a cupholder that attaches to the side of a tackle box or other outdoor equipment. The method also includes the steps of positioning the cupholder such that the base and circular support are extended to support a cup or other item.

Referring initially to the drawings, FIG. 1 illustrates perspective views of one embodiment of the mounting assembly or pole attachment device 100 of the present invention. In the present embodiment, the mounting assembly 100 is a mounting arrangement that attaches to (or may be integrally formed with) the base of a tackle box or other outdoor equipment and allows the box or container to be secured in an opening such as a pole holder on a watercraft, railing on a pier or deck or other structure. The device 100 is especially designed to allow any individual to easily secure the tackle box or other container mounted to the pole attachment device to the opening or pole holder on a watercraft, pier or deck while engaging in water or other activities. More specifically, the device 100 has a mounting component 102, having a top surface 103 and a bottom surface 105 with an insertion element or pole component 126. The mounting component 102 bottom surface 105 has a plurality of side walls or sides 104, 106, 108, 110 and a hinge component 120. Users can easily extend the insertion element or pole component 126 to slide it into an opening or pole holder or other cylindrical cavity on a watercraft or railing while engaging in water-related activities such as fishing, kite flying, flag waving, to secure floatation devices or other toys. Further, the mounting component 102 can be used to attach the mounting assembly or pole attachment device 100 to a watercraft or deck railing when placed in an operative configuration.

It is known that most watercraft are provided with several openings or pole holders around the walls or railings that possess a cavity or opening in which a pole or other element may be inserted into the cavity or opening and secured through a locking, clasping, clamping, or other fastening mechanism. The pole attachment or mounting assembly is displaceable between an inoperative or second configuration, in which it is "folded" away, and an operative or first configuration, in which it serves as a securing mechanism for a tackle box or other outdoor item. Insofar as the general configuration of these pole or rod holders on watercraft is well known, it is not described in further detail herein.

As stated supra, the pole attachment or mounting assembly 100 of the present invention is configured to be the same shape and size of a standard tackle box and includes a mounting component 102 and an insertion element or component 126. The mounting assembly 102 has a right opposing side wall 104 and left opposing side wall 106, as well as top opposing side or end walls 108 and bottom opposing side or end walls 110 as well as a hinge 120 that allows the pole or insertion component 126 to be folded up or retracted into the cavity or base of the mounting component 130 and is entirely within the base so that the mounting assembly lays flat. In one embodiment, the mounting component 102 of the device 100 is a standard tackle box 200 as is known in the art and the mounting component 102 is an add-on aftermarket assembly that can be purchased for installation by the user of the tackle box or other container. The mounting component 102 can be mounted to the tackle box 200 via any suitable securing means as is known in the art, such as glue, screws, hook and loop, snaps, magnets and various combinations thereof, depending on the preferences of a user. In another embodiment, the tackle box 200 and the mounting component 102 are manufactured together as one integral piece and sold as a single unit.

Furthermore, the pole component 126 is attached to the mounting component 102 utilizing a hinge 120, using one or more of a bolt, screw, or other fastening component 122 and a washer or tightening component 124. The insertion element or pole component 126 is attached to the mounting assembly 102 by means of being secured to the top hinge support 116 and bottom hinge support 118 each of which extend downwardly from the platform 102 of the mounting assembly. The hinge supports 116 and 118 and side walls 104, 106, 108, 110 extend downwardly from the base or platform of the mounting assembly 102 an equal distance and ranging from about 1 to 4 inches. Each of the hinge supports 116 and 118 and side walls 104, 106, 108, 110 have a thickness ranging from about ½" to about 2 inches. This provides a stable and level platform on which the tackle box will be supported. The top hinge support 116 and bottom hinge support 118 are fabricated as part of the mounting component 102 and includes pieces of material that protrude from the mounting component 102, but do not impede the mounting component from laying relatively flat or flush against a surface. The top hinge support 116 and the bottom hinge support 118 attach to the insertion element or pole component by means of a bolt, screw, adhesive, hook and look fasteners, magnets or other fastening component or combinations thereof 122 and is secured by a washer or tightening component 124. The hinge mechanism is created by inserting the bolt, screw, or other fastening component 122 through the top hinge support 116, continuing through one wall of the pole component 126, extending through the cavity of the pole component 132, continuing to extend through the other wall of the pole component 126, and through the bottom hinge support 118. After the bolt, screw, or other fastening component 122 extends through these walls, it is secured by a bolt or other fastening device 124 at the bottom hinge support 118. The mounting component 102 is typically rectangular in shape and each opposing side 104, 106, 108, 110 is sized to be slightly shorter in length as compared to the tackle box or other outdoor equipment to which it will be mounted or adhered; however, the mounting component 102 can be any suitable shape and size as is known in the art, depending on the preferences of a user.

More particularly, the plurality of mounting fastening components 128 may include several bolts, screws, or other fasteners 122 that are securable to the mounting component 102 at each of the four right angles on the mounting component 102. To secure the mounting assembly device 100 to a tackle box or other outdoor item, the mounting means may include a fastener that will extend from the inside of the tackle box, through the material of the tackle box, through the material of the mounting component, and will be secured underneath with a mounting fastening component 128. Alternative securing features also may be provided for this purpose.

Figure 2:
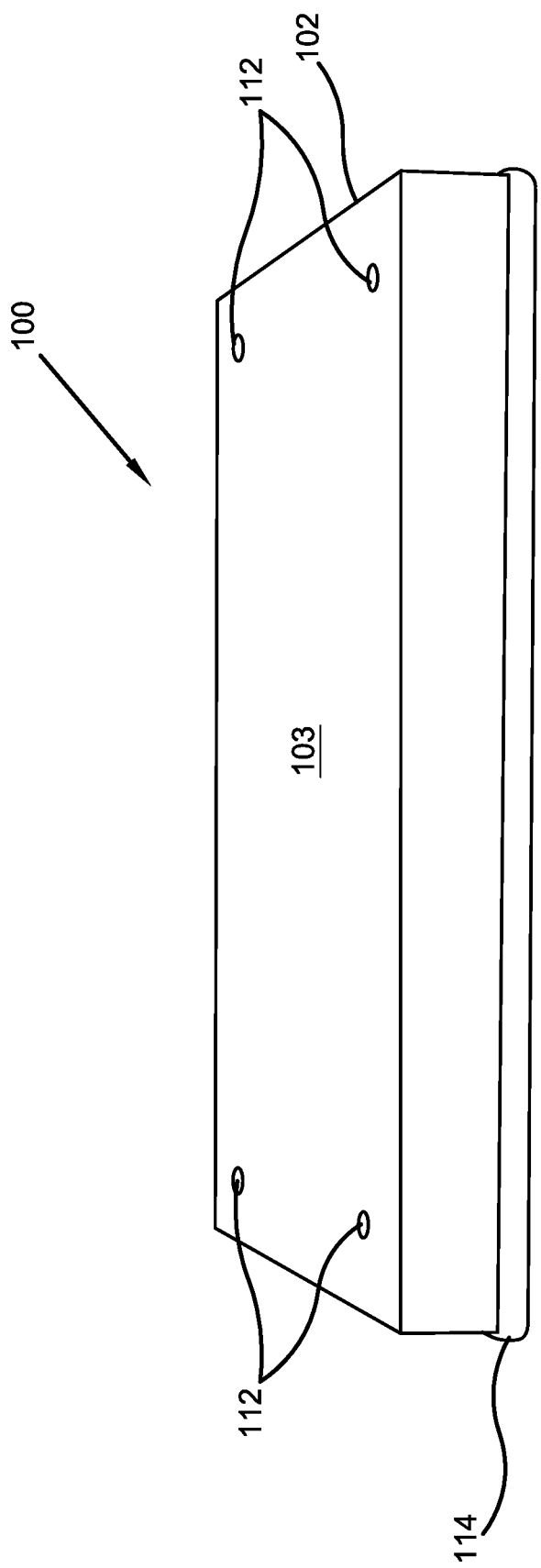
FIG. 2 illustrates a perspective view of one potential embodiment of the insertion or pole attachment device of the present invention with the insertion element or mounting pole retracted into the housing of the mounting assembly and the device laying relatively flush on a surface in accordance with the disclosed architecture.
Figure 3A:
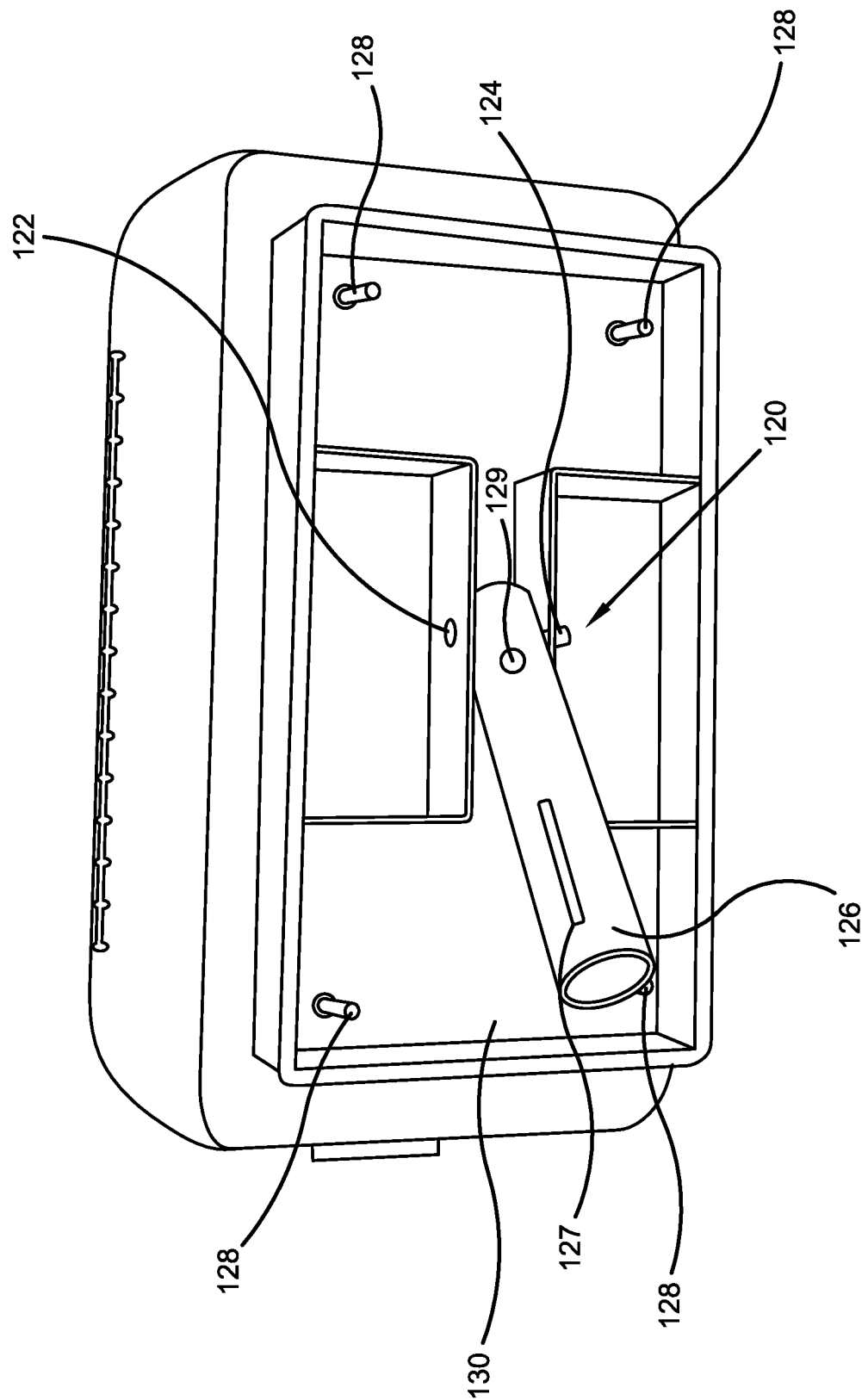
FIG. 3A illustrates a perspective view of one potential embodiment of the pole mounting assembly of the present invention wherein the mounting assembly is fastened to the tackle box or outdoor equipment and the insertion or pole component is extended in accordance with the disclosed architecture.

As shown in FIG. 2, the mounting platform or pole attachment device 100, in an inoperative configuration with the pole component 126, is retracted into the mounting component 102 to allow the mounting component to lay flush against a surface and is detached from any item to which it could be mounted. With the pole attachment device 100 positioned as defined and with the pole component 126 in an operative configuration (as shown in FIG. 3A), the user of an associated tackle box can utilize the tackle box as the pole component 126 is secured or inserted into an opening or pole holder and the mounting component secured, attached, or adhered to the tackle box or other outdoor item. Thus, when the mounting component 102 and pole component 126 are positioned effectively, it is both secured to the tackle box and can be likewise secured into a pole holder to allow the tackle box, together with the pole attachment device 100, to be placed in a secure position during the fishing or outdoor experience.

In one embodiment, the mounting component 102 may be formed of plastic or polymers, such as polypropylene or acrylonitrile-butadiene-styrene ABS), or any other suitable material as is known in the art, such as, but not limited to, acrylic, polycarbonate, polyethylene, thermoplastic, polyethylene terephthalate, polyvinyl chloride, polystyrene, etc., or any other suitable study synthetic plastic material as is known in the art. The insertion element or pole component 126 may be formed of metal or any other synthetic material as is known in the art.

Figure 3B:
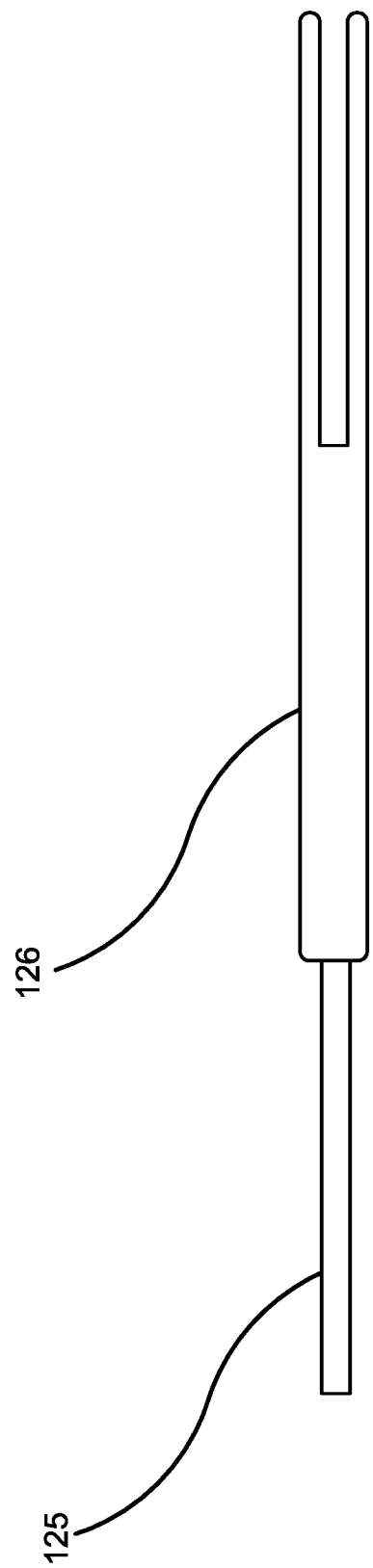
FIG. 3B illustrates the telescoping feature of one potential embodiment of the insertion element of the present invention in accordance with the disclosed architecture.

Further, the overall dimensions and the shape of the mounting component 102 may be greatly variable and, in particular, may be determined based on the preferences of a user. Generally, in this regard, the perimeter of the mounting component 102 may be either slightly larger or smaller than the base of the box or container to which it will be secured and in one embodiment, approximately between three-fourths and five-sixths of the total dimension of the base of the tackle box of the type commonly found in the industry. Also, regarding the pole component, the length may be between 15 cm to 30 cm or longer, depending upon the preferences of the user and the depth of the cavity or opening into which the insertion element is to be positioned. In an additional embodiment, the insertion element 126 may have a telescoping element 125 as seen in FIG. 3B which can be used to extend the length of the element 126. The sides of the insertion element 126 may also be provided with strips of rubber or other gripping material 127 or other material to help hold the box or container within the opening. The strips of gripping material 127 may be 2-6 inches long and ½ inch to 1 inch wide. The insertion element 126 may also include a locking pin 129 to hold the insertion element in the retracted or extended position.

Figure 6:
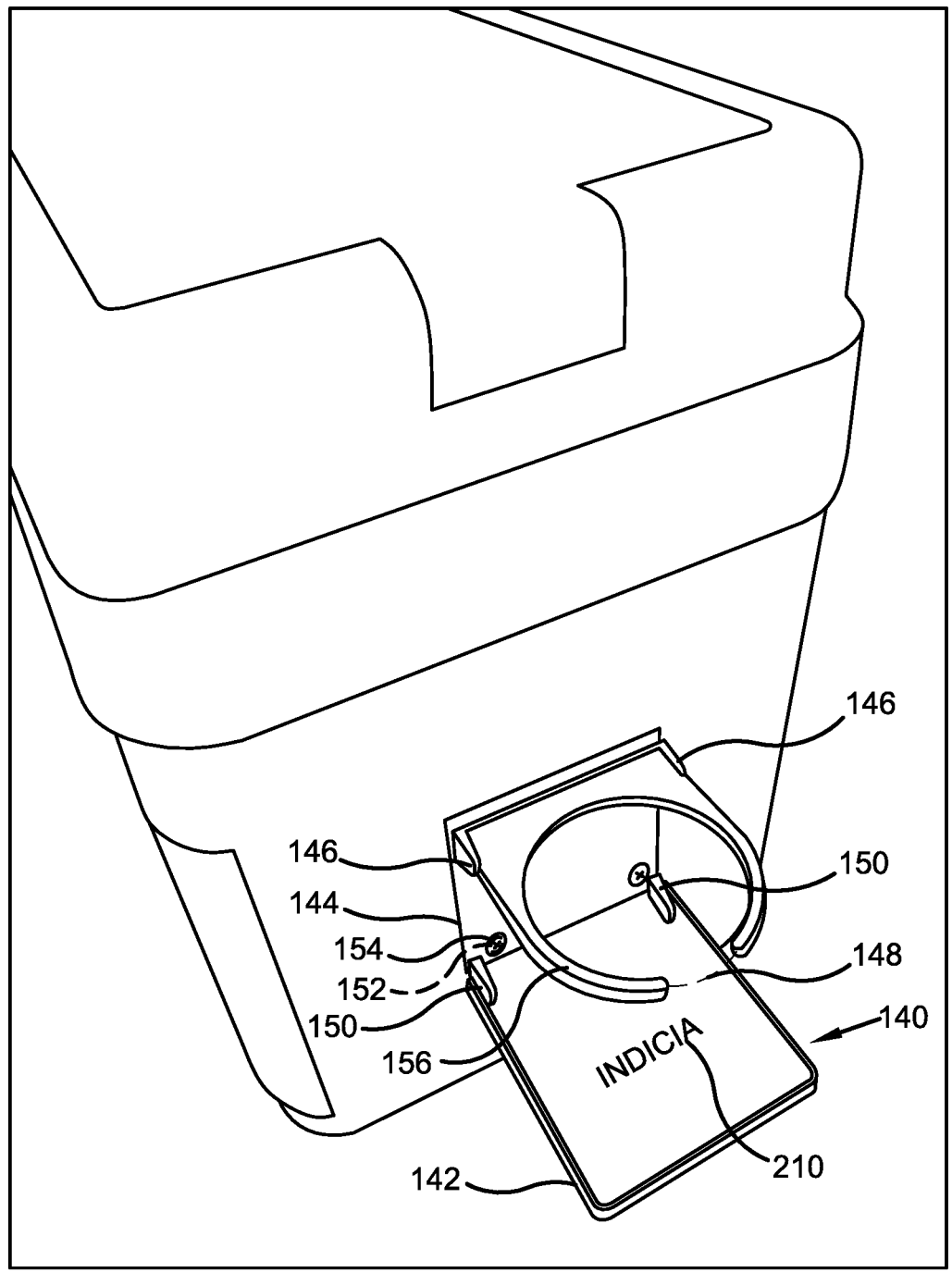
FIG. 6 illustrates a perspective view of one potential embodiment of the cupholder of the present invention secured to a side or exterior surface of the tackle box in accordance with the disclosed architecture.

In another embodiment provided in FIG. 6, the present invention also includes a cupholder device having a base 142 or supporting mechanism along with a side wall 144 and circular supporting arms 156. The circular supporting arms 156 has a space 148 consisting of one-eighth of the circumference of the total circumference of the circular support 156. A hinge mechanism 150 also exists between the base 142 and the side wall 144 allowing the base to fold towards the side wall. A hinge mechanism 146 also exists between the side wall 144 and the circular supporting arms 156. The circular supporting arms would fold or collapse towards the side wall 144 first and then the base 142 would fold or collapse towards the side wall 144 second. The two hinge mechanisms 146, 150 allows the base and the circular support to be folded in and out. The user can grasp each element and easily pull down or extend out both the base 142 and the circular support 156.

More particularly, the means for securing the plurality of fastening components 154 may include several bolts, screws, or other fasteners, which may provide for a permanent attachment or removable attachment that are securable to the side wall 144 of the cupholder device 140 at each of the four right angles on the side wall 144. To secure the cupholder 140 to a tackle box or other outdoor item, the mounting means may include a fastener that will extend from the outside of the tackle box or other outdoor item, through the material of the side wall 144 of the cupholder 140, through the material of the tackle box (or other outdoor item), and will be secured on the inside of the tackle box (or other outdoor item) with a mounting fastening component 154. Alternative securing means also may be provided for this purpose.

In yet another embodiment, the combination of the mounting assembly or pole attachment device 100 and cupholder 140 comprise a plurality of indicia or graphics 210. The mounting component 102 of the pole attachment device 100 and the interior or exterior sides of the base 142 of the cupholder 140 may include advertising, a trademark, or other letters, designs, or characters, printed, painted, stamped, or integrated into the pole attachment device 100 and the cupholder device 140, or any other indicia 210 as is known in the art. Specifically, any suitable indicia 210 as is known in the art can be included, such as, but not limited to, patterns, logos, emblems, images, symbols, designs, letters, words, characters, animals, advertisements, brands, etc., that may or may not be vehicle or brand related.

Figure 4:
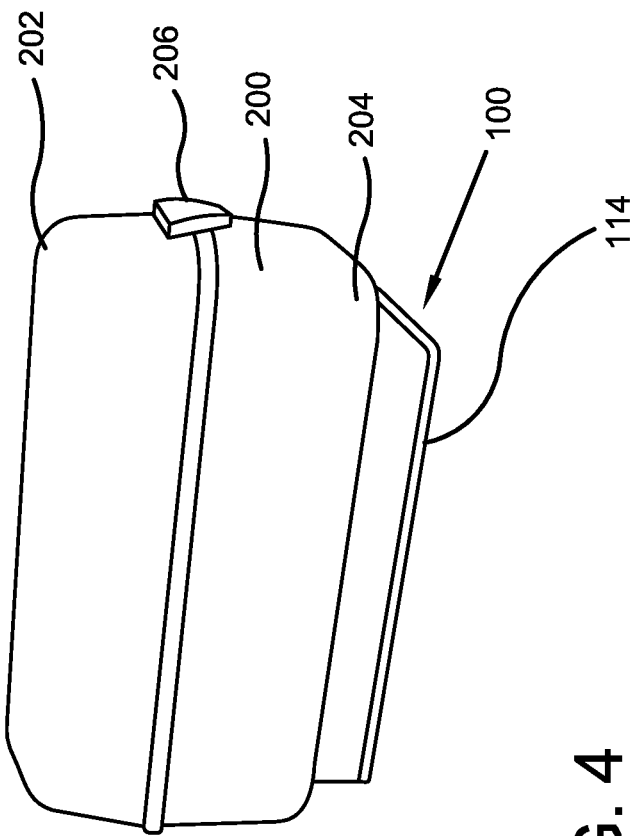
FIG. 4 illustrates a perspective view of one potential embodiment of the pole mounting assembly of the present invention in use at the base of the tackle box with the insertion or pole component retracted and the mounting component laying relatively flush on a surface in accordance with the disclosed architecture.
Figure 4:
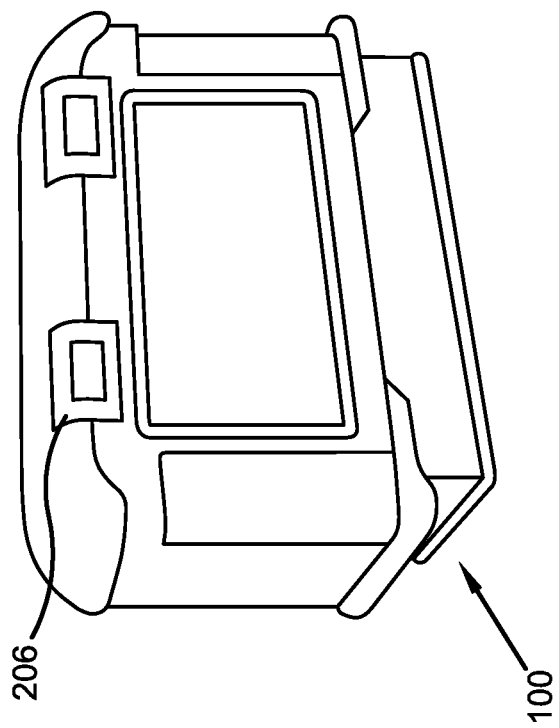
Figure 5:
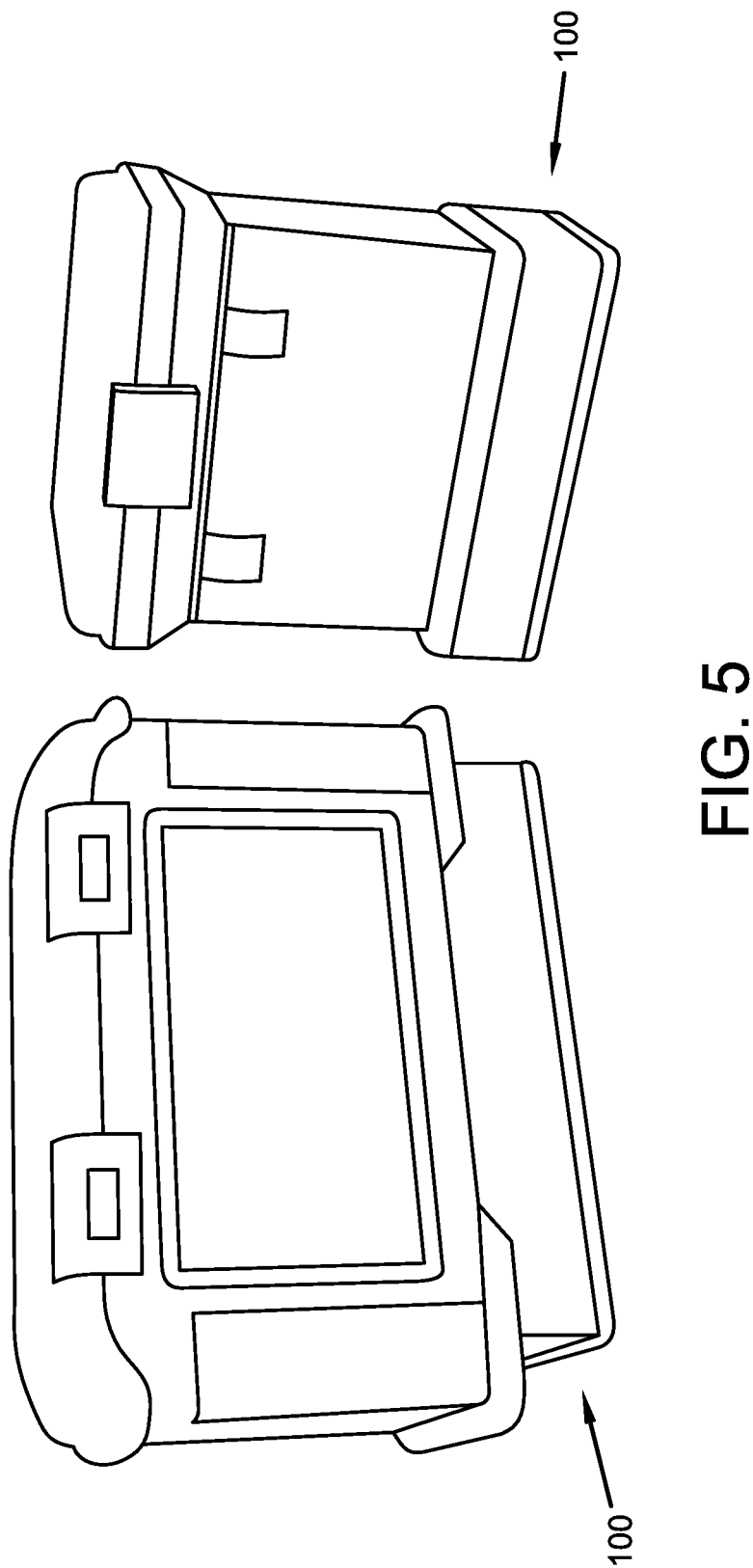
FIG. 5 illustrates a perspective view of one potential embodiment of the pole mounting assembly of the present invention in use at the base of the tackle box (with varying dimensions as compared to FIG. 4) with the pole component retracted and the mounting component laying relatively flat or flush on a surface in accordance with the disclosed architecture.

As shown in FIGS. 4-5, the present invention is shown in use and secured to the tackle box or other outdoor item, the pole component 136 will be displaced into its inoperative configuration and will be folded or collapsed into the mounting component 102. The mounting component 102 will be secured or attached to the tackle box 200 by the mounting fastening components 128 such that they become a single unit. Further, the tackle box 200 will rest on the pole attachment device 100 and can lay flush on a surface such as the railing of a boat, pier or deck. The pole attachment device 100 allows the tackle box or other container 200 to be readily used when needed. Accordingly, the pole attachment device 100 of the present invention acts to allow the user to mount the pole attachment device 100 to the tackle box allowing the tackle box to be placed securely in an opening or a pole holder in a watercraft or pier to allow for safety, convenience, and ease of accessibility while fishing or engaging in other outdoor activities.

Figure 7:
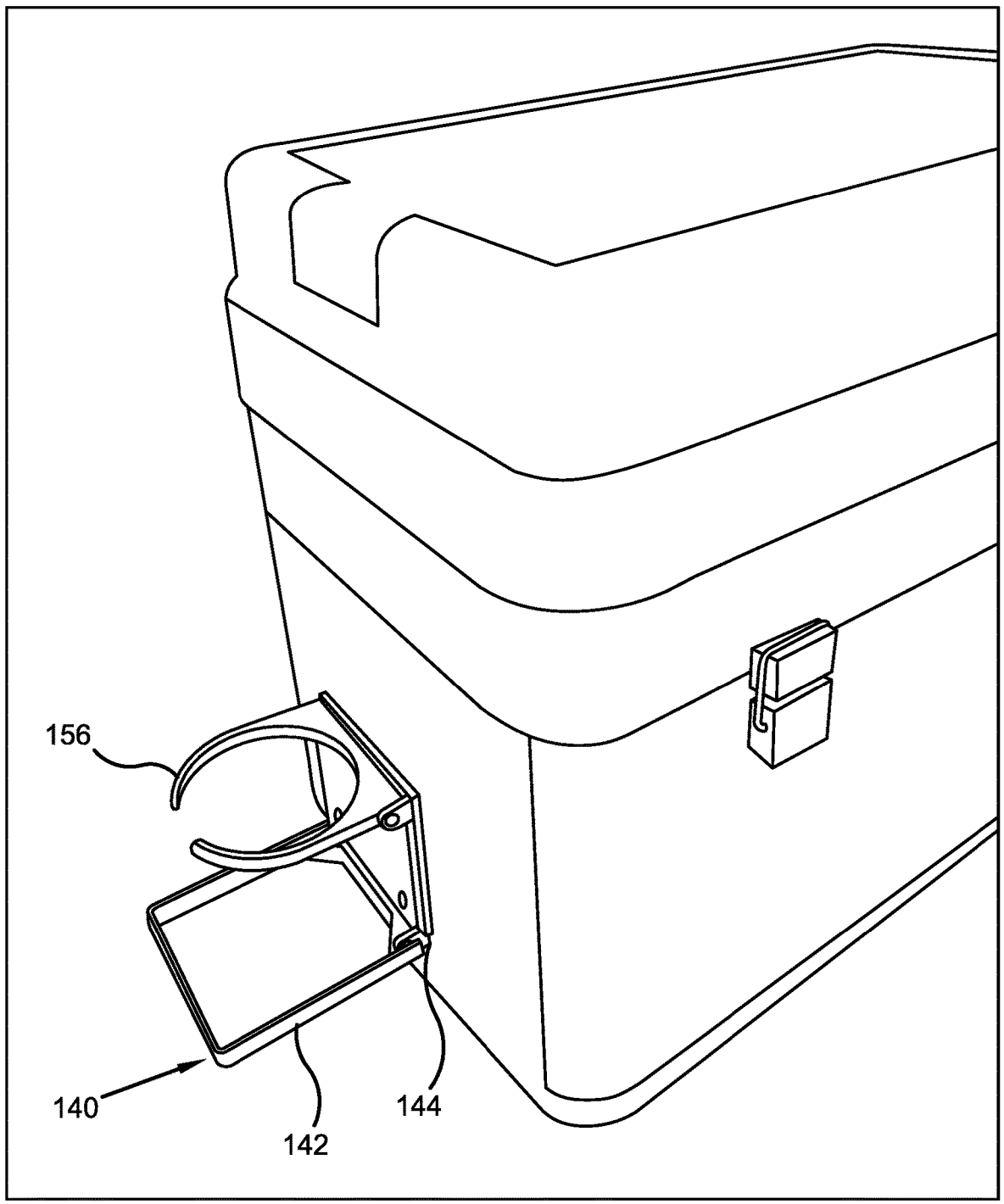
FIG. 7 illustrates a side elevational view of one potential embodiment of the cupholder of the present invention secured to an exterior wall of the tackle box in accordance with the disclosed architecture.

As show in FIG. 6-7, in use, when utilizing the cupholder 140, it will be placed in its operative configuration when it is attached to a tackle box or other outdoor equipment and when the base 142 is extended and erect or perpendicular to the tackle box 200. The circular support will also be erect or perpendicular to the tackle box 200 and the side wall 144. When it is mounted and in an operative configuration, the cupholder device 140 can support a cup, beverage, or other objects while fishing or engaging in other outdoor activities. The cupholder device 140 allows items to be placed in a location where it is secure but also conveniently accessed, thus maximizing both safety and accessibility.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "mounting assembly," "pole attachment device", "insertion element" and "device" and "cupholder device" and "device" are interchangeable and refer to the pole attachment device 100 of the present invention.

Notwithstanding the foregoing, the pole attachment device 100 of the present invention can be of any suitable size and configuration as is known in the art without affecting the overall concept of the invention, provided that it accomplishes the above-stated objectives. One of ordinary skill in the art will appreciate that the mounting assembly or pole attachment device 100 as shown in FIGS. 1-7 are for illustrative purposes only, and that many other sizes and shapes of the mounting assembly or pole attachment device 100 are well within the scope of the present disclosure. Although the dimensions of the pole attachment device 100 are important design parameters for user convenience, the pole attachment device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mounting assembly for use with a tacklebox, the mounting assembly comprising:
    a base having side walls and end walls, a top surface and a bottom surface, wherein the side walls and end walls extend downwardly from the bottom surface;
    an insertion element disposed on the bottom surface of the mounting assembly, wherein the insertion element is movably connected to the bottom surface of the mounting assembly by a hinge and further wherein the hinge is held in position by top and bottom hinge supports; and
    further wherein the insertion element is repositionable between a retracted position and an extended position and, when in the retracted position, lays flat against the bottom surface.

2. The mounting assembly as recited in claim 1, wherein the side walls and end walls extend downwardly from the bottom surface by a length of about 1 to 4 inches.

3. The mounting assembly as recited in claim 1, wherein the side walls, end walls and top and bottom hinge supports have an equal length.

4. The mounting assembly as recited in claim 1, wherein the insertion element is a cylindrical element.

5. The mounting assembly as recited in claim 4, wherein the cylindrical element is comprised from a polypropylene, an acrylonitrile-butadiene-styrene f ABS), an acrylic, a polycarbonate, a polyethylene, a thermoplastic, a polyethylene terephthalate, a polyvinyl a chloride or a polystyrene.

6. The mounting assembly as recited in claim 4, wherein the cylindrical element is comprised of an aluminum or a galvanized steel.

7. The mounting assembly as recited in claim 4, wherein the cylindrical element further comprises a telescoping element.

8. The mounting assembly as recited in claim 4, wherein the cylindrical element further comprises a plurality of strips of gripping material provided on an exterior of the cylindrical element.

9. The mounting assembly as recited in claim 8, wherein the plurality of strips of gripping material are between two and six inches in length and between ½ and one inch in width.

10. The mounting assembly as recited in claim 1, wherein the mounting assembly is secured by a permanent or a removable fastener.

11. The mounting assembly as recited in claim 1, wherein the insertion element comprises a locking pin to hold the insertion element in one of the retracted or extended positions.

12. A combination mounting assembly and cup holder comprising:
   a mounting assembly having a top surface and a bottom surface, wherein a tackle box is mounted on to the top surface via fasteners;
   a plurality of side walls, end walls and hinge supports extending downwardly from the bottom surface;
   a cup holder attached to a side wall of the tackle box; and
   a pole insertion element connected to the hinge supports by a hinge, wherein the pole insertion element is repositionable between a retracted position and an extended position.

13. The combination mounting assembly and cup holder as recited in claim 12, wherein the cup holder comprises a side wall for connecting the cup holder to the side wall of the tackle box and further comprises a base for holding a cup, a bottle or a can and supporting arms.

14. The combination mounting assembly and cup holder as recited in claim 13, wherein each of the base and supporting arms are pivotable about hinges to the side wall.

15. The combination mounting assembly and cup holder as recited in claim 13, wherein the supporting arms are concave.

16. The combination mounting assembly and cup holder as recited in claim 12, wherein the pole insertion element is comprised of a metal or a plastic.

17. The combination mounting assembly and cup holder as recited in claim 12, wherein the pole insertion element is contained within the plurality of side walls when in the retracted position so that the mounting assembly lays flat.

18. The combination mounting assembly and cup holder as recited in claim 12, wherein the fasteners are one of a permanent fastener, a removable fastener or a combination thereof.

19. The combination mounting assembly and cup holder as recited in claim 12, wherein the pole insertion element comprises a plurality of gripping strips and a telescoping element.

20. A tackle box and mounting assembly combination comprising:
   a mounting assembly comprised of a top surface, a bottom surface, and at least one side wall and end wall extending downwardly from the bottom surface
   a tackle box attached to the top surface of the mounting assembly;
   a pole attachment connected to the bottom surface by hinge support walls and a hinge, wherein the pole attachment is repositionable between an extended position and a retracted position and, when in the retracted position, the pole attachment is flat with the at least one side and end wall;
   a gripping material positioned on a surface of the pole attachment; and
   a locking pin to hold the pole attachment in either the retracted position or the extended position.

* * * * *